United States Patent [19]

Harris

[11] 4,180,221
[45] Dec. 25, 1979

[54] SELF PROPELLED KITE

[76] Inventor: Donald E. Harris, Star Route, Payette, Id. 83661

[21] Appl. No.: 869,695

[22] Filed: Jan. 16, 1978

[51] Int. Cl.² ............................................. B64C 39/00
[52] U.S. Cl. .............................. 244/13; 244/DIG. 1; 244/153 R; 46/78
[58] Field of Search ...................... 244/13, 16, DIG. 1, 244/54, 55, 60, 153 R, 154, 155 A; 46/74 R, 74 C, 76 R, 77, 78, 93, 79; 115/1 C

[56] References Cited

U.S. PATENT DOCUMENTS

| | | | |
|---|---|---|---|
| 1,265,797 | 5/1918 | Lurz | 244/153 R |
| 1,712,758 | 5/1929 | Durand | 115/1 C |
| 3,204,368 | 9/1965 | Effinger et al. | 244/154 |
| 3,222,816 | 12/1965 | Effinger et al. | 46/78 |
| 3,276,730 | 10/1966 | Cleveland | 244/153 R |
| 4,015,555 | 4/1977 | Tinkham | 115/1 C |
| 4,076,189 | 2/1978 | Powell | 244/153 R |

OTHER PUBLICATIONS

Poynter, "Hang Gliding", pp. 190-191, 1976.

*Primary Examiner*—Galen L. Barefoot
*Attorney, Agent, or Firm*—Paul F. Horton

[57] ABSTRACT

A self propelled kite having a frame including a nose piece, a stringer backwardly extending from the nose piece, and two spars attached to the nose piece equidistant and outwardly diverging in an upward inclination from the stringer. A substantially V-shaped fairing is connected between the spars and beneath the stringer. A propeller driven by a small internal combustion engine is the prime mover, being located above the fairing and mounted to the stringer. The kite may also have a rudder with rudder control mounted above the stringer and rearward to the propeller. The kite may also contain landing struts, air intake ports for unassisted take off, and cargo carrying apparatus.

4 Claims, 7 Drawing Figures

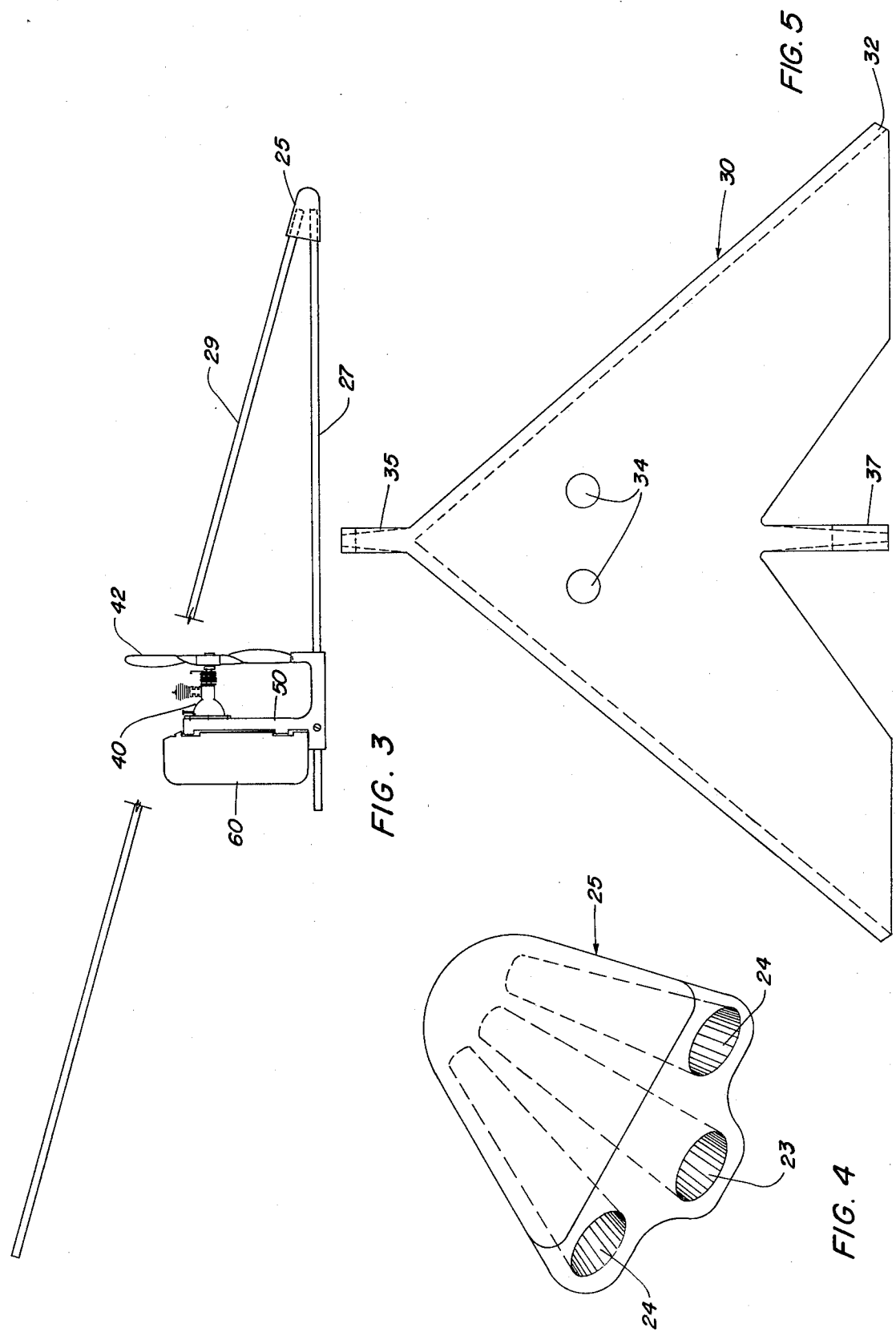

SELF PROPELLED KITE

BACKGROUND OF THE INVENTION

1. Field of the Invention

This invention relates, in general, to engine propelled aircraft, and in particular to self propelled kites.

2. Description of the Prior Art

Kite flying has long been recognized as one of this country's favorite pastimes. Kites of many shapes and sizes have been created to suit the many fancys of kite enthusiasts. Generally speaking, kites have three elements in common, namely a framework, a skin covering or fairing, and a tether for holding the kite against wind movement and for recovering the kite. The most common kite is well known in construction, having a longitudinal rib or stringer with an attached bowed crosspiece forming a substantially T-shaped frame; a fairing generally of paper or plastic with string girders about the periphery. This simple construction provides good lift and stability when properly tethered with the nose pointed into the direction of the wind. Primary drawbacks to kites are the requirements of having sufficient breeze to lift the kite or sufficient movement by the operator to sustain the lift. In addition, kites must be kept on a tether thereby preventing the advantage of free flight.

Generally, the attempt to overcome these disadvantages have resulted in model airplanes having propellers driven by very small internal combustion engines or by electric motors as typified by U.S. Pat. No. 3,957,230 issued to Boucher et al. Such model planes are very well known in the art. While overcoming the problem of the necessity of proper wind currents for flight, and while overcoming the disadvantage of having a tether in remote controlled models, free flying airplanes have their own disadvantages. Because of weight to wing surface ratio problems, these model airplanes must of necessity fly at a relatively high speed thereby increasing the probability of damage of the airplane upon impact and increased damage to the object impacted. Furthermore the engine with rapidly moving propeller is located in the front of the airplane where damage to the propeller and engine, on impact, are greatly increased and where injury to the individual may be severe. The faster flight and smaller size of such airplanes increase the chance of airplane loss and also makes observation difficult. Recent attempts to overcome these disadvantages have resulted in inventions as typified by U.S. Pat. Nos. 3,153,877 and 3,204,368 issued to W. L. Effinger, Jr., et al. The Effinger type craft requires a front stabilizer wing, a flexible fairing with cross bracing, and carries the power plant below the frame of the craft thereby presenting problems of engine and propeller damage upon take-off or landing and the necessity of a shroud and bracing beneath the engine and propeller. Additional disadvantages of existing craft are high cost of production, difficulty of assembly, high cost of packaging and problems of portability.

SUMMARY OF THE INVENTION

The present invention comprises generally, a self propelled kite having a frame including a nose piece, a stringer backwardly extending from the nose piece and two spars attached to the nose piece equidistant and outwardly diverging from the stringer; a fairing connected to and extending between the spars and beneath the stringer; propulsion means located above the fairing and mounted to the stringer; and a rudder mounted to the stringer.

It is therefore a general object of the present invention to provide a self propelled kite, without tether, which may be flown in the absence of wind.

It is also a general object of the present invention to provide a self propelled kite which is easily assembled and disassembled, of low cost, which requires a low cost packaging, and which is highly portable.

It is also an object of the present invention to provide a self propelled kite which is capable of low speed flight and which is aerodynamically designed to have a propensity to fly directly into the wind.

It is further an object of the present invention to provide a toy propeller driven aircraft having the power plant and propeller above the wing surface and substantially to the rear of the craft.

A still further object of the present invention is to provide a self propelled kite having a rudder and rudder control means.

Additional objects and advantages will become apparent and a more thorough and comprehensive understanding may be had from the following description taken in conjunction with the accompanying drawings forming a part of this specification.

BRIEF DESCRIPTION OF THE DRAWINGS

FIG. 3 is an elevated view of the apparatus of FIG. 1, without the fairing.

FIG. 4 is a perspective view of the nose piece.

FIG. 5 is a plan view of the fairing of the present apparatus.

DETAILED DESCRIPTION OF THE INVENTION

Figure 1:
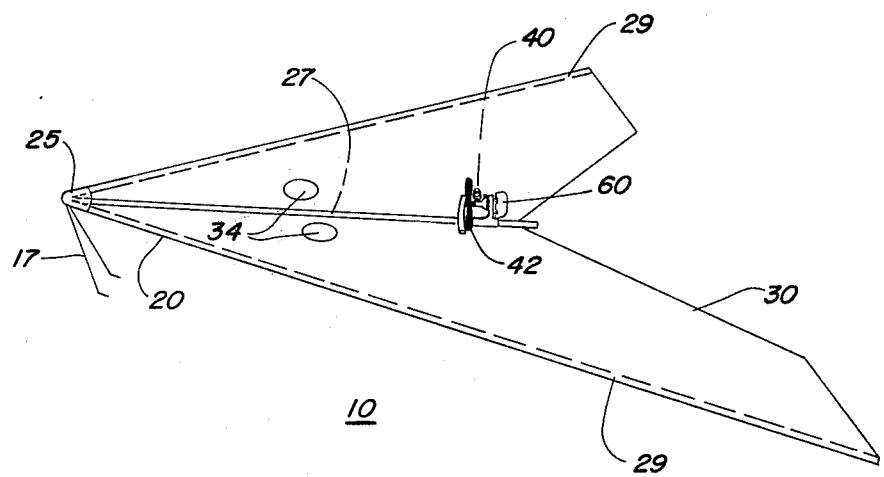
FIG. 1 is a perspective view of a preferred embodiment of the self propelled kite apparatus of the present invention.

Referring now to the drawings, and, more particularly to FIG. 1, an embodiment to be preferred of a self propelled kite 10, made according to the present invention is disclosed. Self propelled kite 10 includes a frame 20, fairing 30, propulsion means 40, and rudder 60.

Frame 20 includes nose piece 25, stringer 27, and a pair of spars designated by the numeral 29. Noise piece 25, seen to better advantage in FIG. 4, is substantially triangular in shape and includes, in one embodiment, a central rearwardly extending slot 23 and a pair of divergent slots 24. Nose piece 25 may be fabricated of any suitable material, it being preferred that the nose piece be cast from aluminum or other light weight metal or from high impact plastic. It is preferred that the front of the nose piece be rounded to prevent damage or injury upon impact. The triangular shaped nose piece may be approximately equilateral in design, each side being approximately one and one half inches in length. Slots 23 and 24 are ¼" in diameter and of sufficient length to securely hold the stringer and spars. Slot 23 is parallel to the top surface of the nose piece, while slots 24, operable to hold spars 29 in temporary engagement, extend from the front of the nose piece upwardly toward the rear at an angle of 18° to slot 23 and at an angle of 80° to each other on the same plane equidistant from slot 23. Stringer 27, in the preferred embodiment, is approximately 20" in length, is slightly under ¼" in diameter so that it may be conveniently but tightly held in slot 23 of nose piece 25, is rod shaped being circular in cross section and is preferably constructed of hard wood or conventional rigid plastic. In the second embodiment it is contemplated that stringer 27 be integral with nose piece 25 and therefor constructed of the same material as the nose piece. Spars 29 are also preferably rod shaped and are fabricated of either hardwood or rigid plastic, the preferable length being 36". Spars 29 are insertable into and in axial alignment with slots 24 of nose piece 25 for convenient assembly and disassembly.

Figure 2:
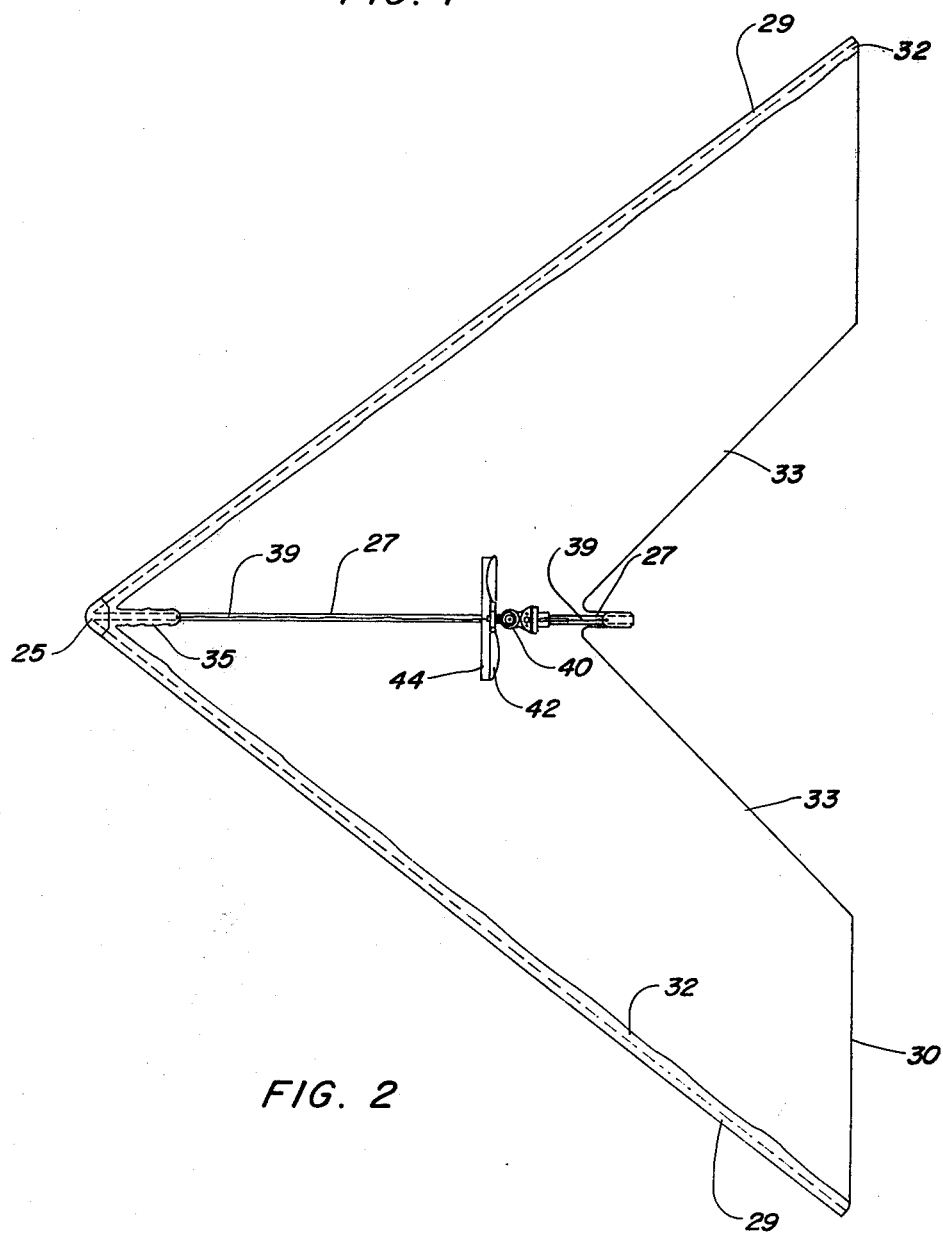
FIG. 2 is a plan view of the apparatus of FIG. 1.

Referring now to FIGS. 1 and 2, fairing 30 of apparatus 10 may be seen to advantage. Fairing 30 is the skin or convering extending between the spars and connected thereto for giving lift to the craft. Fairing 30 is substantially V-shaped in construction, flaring from the terminal free ends of spars 29 to a midpoint adjacent the terminal free end of stringer 27. The fairing extends from each end of spar 29 inwardly toward the opposite spar approximately 12", thereby providing an effective flap 33. The fairing may include a pair of ducts 32 approximately 35" in length adjacent the terminal side edges for insertion of spars 29, as shown in FIG. 5. Fairing 30 is preferably made of thin polyethylene sheeting and is cut to a size to provide a moderately tight fit between the spars and under stringer 27. The fairing may also include oppositely disposed extension portions, front extension 35 and rear extension 37, also seen to advantage in FIG. 5. Extension 35 is located beneath nose piece 25 and is pulled upwardly and backwardly over the nose piece for attachment to stringer 27. Similarly, extension 37 is fitted below stringer 27 and is pulled upwardly and forwardly over the terminal most end of stringer 27 for secure attachment to the stringer. Both front extension 35 and rear extension 37 may have attached to it, an elastic band, such as a rubber band, for convenient attachment to a hook 59, as shown mounted upon mounting bracket 50 in FIG. 6, secured to the stringer. The rubber band, besides permitting easy attachment of the fairing to the stringer, also keeps the fairing under constant tension; the amount of tension depending upon the elasticity and length of the band. Fairing 30, in its preferred embodiment, includes a pair of air intake ports designated by the numeral 34, shown in FIGS. 1 and 5. Air intake ports 34 are located forward to propulsion means 40, preferably one on each side of stringer 27. Once engine 40 is started, sufficient air stream flow below the fairing and up throught ports 34 allows unassisted take-off from a ground position of craft 10. To facilitate take-off and landing, apparatus 10 may also include a pair of ground support struts 17 downwardly and backwardly extending in a divergent manner from nose piece 25. Struts 17 are fabricated from thin, light-weight, spring wire for absorbing shock.

The propulsion means preferred is the conventional small internal combusion airplane engine 40 which drives propeller 42. Other propulsion means such as the jet engine or propeller equipped battery driven electric motor may also be used as a source of propulsion power. Engine 40 mounted to stringer 27 by means of support bracket 50, seen to advantage in FIG. 6. Mounting bracket 50 constitutes a superstructure which is demountably attached to stringer 27. Bracket 50 also serves as mounting means for rudder 60, as will hereinafter be explained. Mounting bracket 50 preferably includes stringer engagement clamping base portion 51 which may be cylindrical in form, having an inside diameter only greater than the diameter of stringer 27. Base portion 51 includes a threaded aperture transverse to the axis of the cylinder for insertion of machine screw 52 which may be tightened securely against stringer 27. It is contemplated that the mounting bracket may be shifted forwardly or rearwardly on stringer 27 until proper balance is maintained, and the mounting bracket may then be fastened securely at the desired position along the length of the stringer. The mounting bracket also includes a vertically extending upright 53 which is secured to the uppermost terminal edge of the stringer engagement portion 51. Upright 53 has at its uppermost frontal portion and engine mounting bracket 54 to which engine 40 is attached by means of machine screws and nuts, or otherwise. At its rearward end, upright 50 has a pair of vertically spaced rudder pin receiving brackets 55 by which rudder 60 is attached. Adjacent the lowermost terminal edge of upright 53 is a horizontally planar rudder control block 57. The block may be integral with stringer engagement portion 51, as may be seen in the perspective view of FIG. 7. The rudder control block includes a plurality of rudder engagement grooves 58 extending outwardly horizontal in the top of the planar surface from a common focal point in line with the frontal edge of rudder 60. Grooves 58 are operable to receive the lower most terminal edge of rudder 60. Bracket 50 may also contain, at its forward most portion, a propeller guard 44, arcuate in form, to prevent upward movement of fairing 50 into propeller 42. Although generally not a problem, the fairing may come into contact with the propeller upon impact of the device if guard 44 is not in place. The guard may be integral with stringer engagement portion 51 or may be separately locked into fixed engagement with mounting bracket 50. Bracket 50 may also contain attachment means for elastic bands 39 for holding the fairing in place. The attachment means in the present embodiment takes the form of screw 59.

Figure 6:
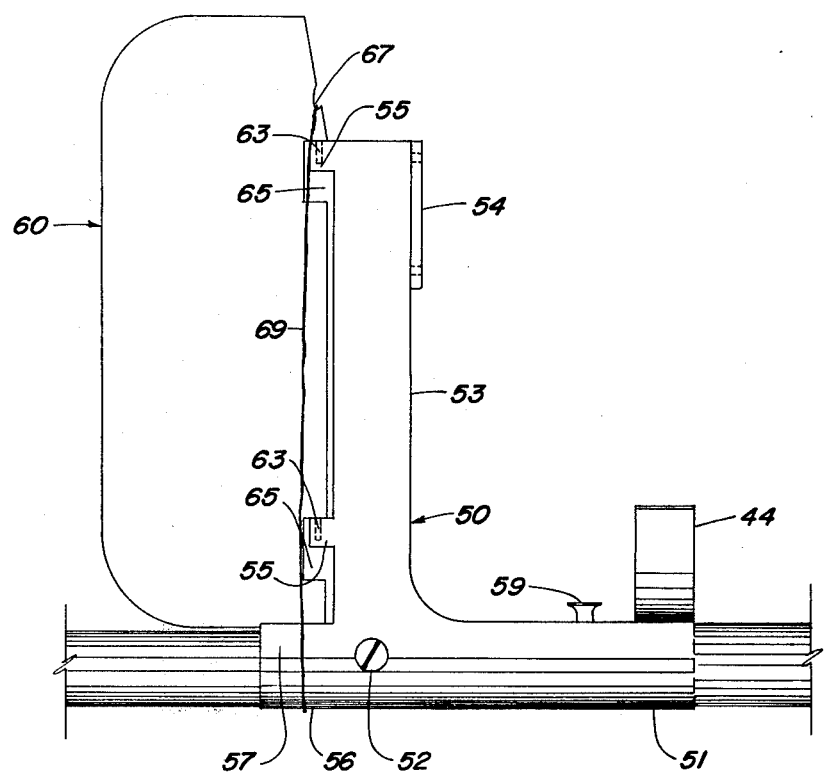
FIG. 6 is a detailed view of the propulsion and rudder mounting means of the present invention.
Figure 7:
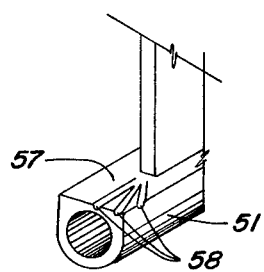
FIG. 7 is a perspective view of one embodiment of the ruder control of the present invention.

In one preferred embodiment of the invention, the rudder, as designated by numeral 60, as in FIGS. 1 and 2, may simply be left off. Craft 10 will then fly in one direction only and will align itself into any wind, attempting to fly against the wind. Rudder 60 is a desirable addition to the craft, in that setting the rudder will enable the craft to fly in large or small circles, depending upon the angle of the rudder. Rudder 60 is a thin, substantially rectangular plate, fabricated preferably from aluminum or plastic. Adjacent its frontal terminal edge, rudder 60 includes a pair of slots 65 in which a downwardly extending pin 63 extends for pivotal engagement in brackets 55, above referred to. Juxtaposed slightly vertical to uppermost pin 63 on the frontal edge of rudder 60 is a hook 67 which may take the form of an indentation. An elastic band 69, as seen in FIG. 6, is looped about hook 67, pulled over the rudder and attached to the underside of stringer engagement portion 51 which may have an indentation 56. Rubber band 69 holds pins 63 of rudder firmly in place in brackets 55, while allowing pivoting of the rudder. Rudder 60 may be locked into place into a selected groove 58 of control block 57 by simply lifting rudder 60 vertically against the pull of band 69 and locating in a selected groove for steering the craft in a desired arc.

While free flight of the craft is contemplated, it is also to be noted that the craft may be controlled by either a tether attached to the underside of the craft or by remote control means, now standard for model airplanes. It is also contemplated that craft 10 may also have topy personnel and cargo carrying means, not shown, which may downwardly depend from stringer 27 to a position below the fairing.

Craft 10 is assembled for flying by inserting spars 29 through ducts 32 into slots 24 of nose piece 25 with the top of fairing 30 resting against the bottom of stringer 27. Mounting bracket 50 is slipped over the rearward terminal end of the stringer and is clamped onto the stringer in a balanced position. Front extension 35 of fairing 30 is then pulled upwardly and backwardly over nose piece 25 and is attached to hook 59 of mounting bracket 50. Similarly, extension 37 is pulled upwardly and forwardly over the terminal end of the stringer and is also attached to hook 59. The engine with propeller may then be mounted on the mounting bracket and rudder 60 attached by inserting pins 63 into pin receiving brackets 55. Rubber band 69 is then hooked over rudder hook 67, looped over the rudder and fitted into groove 56 on the bottom of mounting bracket 50, thereby holding the rudder down into a selected groove 58 of rudder control block 57.

Once assembled, the engine is started, and the craft either placed upon the ground or held by the terminal ends of spars 29, a few feet above the ground. Without tether, the craft will arc upward, the diameter of the arc being determined by the rudder control setting and the wind conditions. The craft will continue to climb until its supply of fuel is exhausted, at which time, it will fly into any prevailing wind until landing.

Having thus described in detail a preferred selection of embodiments of the present invention, it is to be appreciated and will be apparent to those skilled in the art that many physical changes could be made in the apparatus without altering the inventive concepts and principles embodied therein. The present embodiments are therefore to be considered in all respects as illustrative and not restrictive, the scope of the invention being indicated by the appended claims rather than by the foregoing description, and all changes which come within the meaning and range of equivalency of the claims are therefore to be embraced therein.

I claim:
1. Self propelled kite apparatus comprising:
a frame including a nose piece, a stringer backwardly extending from the nose piece and two spars attached to the nose piece, equidistant and upwardly and outwardly diverging from the stringer;
a fairing connected to and extending between the spars beneath said stringer, said fairing being fabricated from flexible sheeting material including a pair of longitudinally extending, divergent ducts, each duct adjacent an outer terminal edge of said fairing and adapted to receive one of the spars; propulsion means mounted to the stringer above the fairing and said fairing defining at least one air intake port forward of said propulsion means;

2. Self propelled kite apparatus comprising:
a frame including a nose piece, a stringer backwardly extending from the nose piece and two spars attached to the nose piece, equidistant and upwardly and outwardly diverging from the stringer;
a substantially V-shaped fairing of flexible sheeting material connected to and extending between the spars beneath said stringer, said fairing including a pair of longitudinally extending, divergent ducts, each duct adjacent an outer terminal edge of said fairing and adapted to receive one of the spars. said fairing further including two oppositely disposed extension portions; a first portion forwardly extending at the apex of the fairing and adapted to be pulled backwardly over the nose piece for attachment to the stringer; and a second portion rearwardly extending adjacent the rear midpoint of said fairing and adapted to be pulled forwardly over the rearward terminal end of the stringer for attachment to the stringer, each of said extension portions including elastic means connected thereto for attaching the extension portions to the stringer and to maintain the extension portions under a selected constant tension; and
propulsion means mounted to the stringer above the fairing.

3. Self propelled kite apparatus comprising:
a frame including a nose piece, a stringer backwardly extending from said nose piece and two spars attached to said nose piece, equidistant and outwardly diverging from the stringer;
a substantially V-shaped fairing connected to and extending between the spars and beneath the stringer;
propulsion means; and
propulsion mounting means including a stringer clamping portion; a vertically extending upright secured to said clamping portion; a propulsion means mounting member attached to the front of said upright; rudder mounting members attached to the rear of said upright; and a rudder control block adjacent the rearmost terminal edge of said clamping portion, said rudder control block including a plurality of rudder engagement grooves extending outwardly, horizontally and radially from a point below and vertically spaced from said rudder mounting members.

4. The apparatus as described in claim 3 wherein said rudder includes a hook adjacent its forwardmost terminal edge, said hook operable to engage an elastic member for holding said rudder in demountable engagement with one of the grooves.

* * * * *